Dec. 6, 1938.   T. T. TOWNSEND   2,139,477
AUTOMATIC BATTERY FILLING DEVICE
Filed March 30, 1937
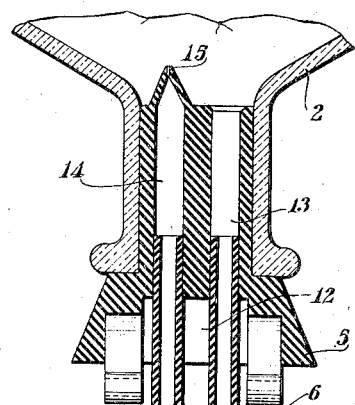
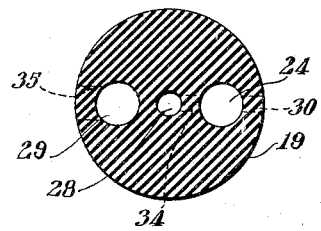
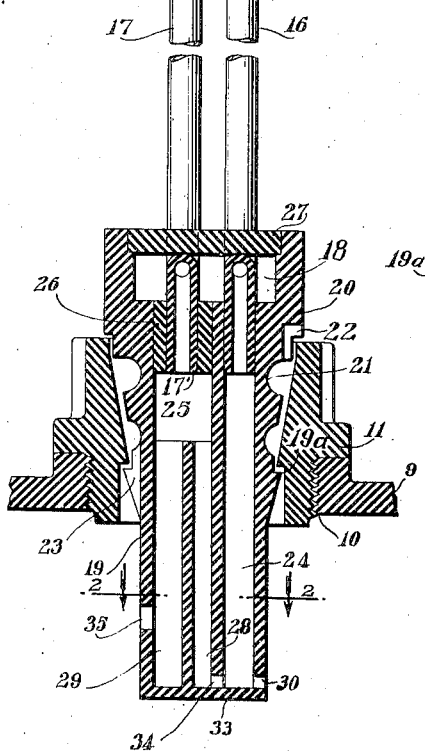
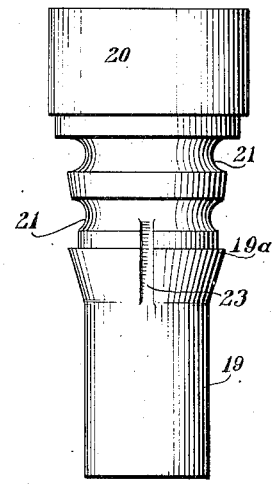
INVENTOR
Thomas T. Townsend
BY
ATTORNEYS Patented Dec. 6, 1938

2,139,477

UNITED STATES PATENT OFFICE 2,139,477

AUTOMATIC BATTERY FILLING DEVICE

Thomas T. Townsend, New York, N. Y.

Application March 30, 1937, Serial No. 133,752

6 Claims. (Cl. 137—68)

This application is a continuation in part of my application, Serial No. 13,998, filed April 1, 1935.

The present invention relates to improvements in automatic battery filling devices for maintaining the level of the electrolyte in a storage battery cell within certain high and low limits of variation. The apparatus is designed to act automatically under the control of the level of the electrolyte to add a sufficient quantity of liquid when the surface of the electrolyte is low in the battery to raise the level of the electrolyte therein to its high or normal point, and then automatically arrest the operation. The construction and principle of operation are such as to restore the liquid level in the battery without danger of flooding, which has been a serious difficulty in prior devices of this character.

The invention is applicable to stationary batteries, but is peculiarly effective for use with batteries supported on moving vehicles in which, owing to the trembling and swaying of the vehicle and its departures from level generally, the electrolyte in the battery is subjected to constant alterations, local or general, in level. The present construction is adapted to take advantage of such fluctuations in level of the fluid to promote instead of impair effective operation and to prevent an over-supply of fluid to the battery.

The battery to which the invention is applied may be made up of one or a plurality of cells. Usually the battery of an automobile has three cells and each cell is supplied with replenishing liquid from an independent reservoir connected by conduits to its corresponding cell, each reservoir and cell with their connecting conduits being a distinct system, although the several supply tubes may be bound together for protection and convenience in a single protecting envelope in that part of their length lying between the reservoirs and the battery.

In carrying out the purposes of the present invention, each storage battery cell is connected with an independent water supply reservoir through two independent conduits, one being a water supply tube leading from the reservoir to the battery cell and the other being an air aspirating tube leading from the battery cell to the reservoir. These independent tubes connect respectively with a water supply passageway and an air inlet passageway in the body of a control member that is supported upon the closure cap in the filling opening of the battery cell and projects into the cell with its lower end submerged in the electrolyte above the plates. The air inlet passageway and the water supply passageway are formed with laterally opening ports at different levels in the control member, the port of the water supply passageway being just above the bottom wall of the control member and intended to be permanently submerged in the electrolyte, while the port of the air inlet passageway is on the opposite side of such member and at a slightly higher level to determine the minimum level of the electrolyte. The upper ends of each pair of water supply and air inlet tubes leading from the control member are attached to a channeled soft rubber stopper removably mounted in the mouth of an inverted bottle, one of which constitutes the water supply reservoir for each battery cell. The inner end of the air inlet channel in the supply reservoir stopper is arranged with a check valve, or has a diminished passage to act approximately like a check valve, in permitting the upward flow of air from the vent tube while obstructing the downward flow of liquid into that tube.

The flooding of the battery which has occurred with some prior devices has principally been due to the disturbance of the static conditions in the system by the dynamic action of the surging electrolyte in the battery cells of a moving automobile. My copending application Serial No. 133,751 describes a means of controlling these dynamic forces by the utilization of relatively large capillary surfaces at the port or ports entering the air passageway. The present application covers another means of preventing the static conditions within the system from being interfered with by the surging of the electrolyte, namely by baffling.

In order that the invention may be fully understood, it will first be described with reference to the accompanying drawing, and the novelty will afterwards be pointed out in the annexed claims. In said drawing Figure 1 is a vertical sectional view of the operative parts of my improved battery filling device, parts of the reservoir, the cell, and connecting tubes being broken away.

Figure 2 is a transverse sectional view taken on the line 2—2 of Figure 1.

Figure 3 is a side view of the control member for the battery cell, and

Figure 4 is a like view taken at a point 90° removed from that illustrated by Figure 3.

One of a nest of (usually three) inverted bottle reservoirs 2 is shown, removably retained upon a support (not shown) at suitable height above the battery, which is usually placed on the chassis. Each bottle reservoir is provided with a removable soft rubber stopper 5, having means including metal eye clips 6 to so support the reservoir as to enable it to be swung from vertical to horizontal position, at which position the operator is enabled to free the bottle from the stopper 5 and replenish the water therein, after which the bottle is again closed by engagement with its stopper and returned to its inverted position as shown, and there held detachably in any suitable manner.

Two independent flexible tubes communicate with each stopper 5 as hereinafter more specifically described, and the several pairs of tubes from the several reservoirs may be, for convenience, brought and held together as a unit, by means not shown, in that portion of their length extending between the reservoirs and the battery cells.

9 indicates the top or cover of a cell which may be one of the usually associated three cells forming the battery of standard design of an automobile. The cell has a screw-threaded filling opening 10, normally closed by the screw-cap 11, in the axial opening through which is freely mounted the control member hereinafter described.

Referring to the upper, reservoir, member of the assembly, it will be noted that the soft rubber stopper 5 is molded, in the enlarged part of the stopper lying below the bottle neck, with a chamber or recess 12, inwardly—that is, toward the interior of the bottle reservoir—from which extend the water supply passageway 13 and the air inlet passageway 14. The passageway 13 opens freely into the bottle reservoir, while the passageway 14 is preferably provided at the end communicating with the bottle interior with means for permitting the passage of air into the bottle but impeding the outflow of liquid, such means being an upwardly opening check valve of any preferred form, or as here shown, the passageway may end in a conical teat 15 having a small opening, not allowing free passage to liquid, but permitting air to slowly pass.

16 is a small bore flexible rubber tube having its upper end fitting snugly in and forming a continuation of the water supply passageway 13 of the stopper 5. 17 is a similar small bore flexible tube having its upper end snugly fitting the air inlet passageway 14 of the stopper 5.

It will of course be understood that the bottle reservoirs, illustrated by bottle 2, are to be supported at a sufficient elevation above the storage battery that is to be served, to ensure the water flowing from the reservoirs to the battery cells by gravity under control of the improved control members supported in the filling openings of the battery cells.

The control member 19 consists of a substantially cylindrical-shaped body of hard rubber or the like, formed with suitable passageways, presently to be referred to, and with an enlarged recessed head 20, shouldered to rest upon the upper edge of the hollowed-out cap 11. This control member is formed with one or more annular venting grooves 21 in the slightly tapered central portion of the member, which rests loosely within the tapered socket of the cap 11, and slightly spaced from the wall thereof. The material of the control member is sufficiently elastic to allow the member to be inserted in the hollowed-out cap, the tapering gradually converging sides of the two members facilitating the movement of one part on another until they are held from separation by the engagement of their shoulders 19ª, this engagement being preferably snug enough to hold control member and cap firmly together while permitting relative rotation for screwing the cap 11 into the battery. There is an upper venting slot 22 formed in the head 20 which communicates with the upper venting groove 21 and a similar lower venting slot 23 which communicates with the lower venting groove 21. By these connecting grooves and slots the battery cell is vented and open to atmospheric pressure as usual.

The water supply tube 16 and the air inlet tube 17 are led into the recess 18 of control member head 20 through suitable openings in the side of the head and from said recess communicate respectively with the water supply passageway 24 and air inlet passageway or air chamber 25. The end of the tube 16 fits snugly in the upper end of the passageway 24 while the other passageway receives a thimble 26 in which the inner end 17' of the tube 17 is snugly fitted. A suitable seal 27 closes the recess of the head 20. The air venting passageway or chamber 25 below the thimble 26 is enlarged to the full diameter of said thimble to form a chamber of large cross-section having functions which are hereinafter described. From it extend downwardly the inner and outer branches 28 and 29 of the air inlet passageway. The branch 29 is of somewhat larger diameter than the branch 28.

The water supply passageway has an outlet port at 30 immediately above the bottom wall 33 of the control member, which wall is imperforate and approximately horizontal in the normal position of said member. In normal operation, the port 30 is permanently submerged. The air branch 29 or aspirating tube has an air inlet port 35 in the side wall, at a distance above the water outlet port 30 determined by the required margin between low and high electrolyte level, the height of the air inlet 35 being such that the air will enter it from the cell when the water level goes below the desired minimum, as by evaporation. It is best made of larger diameter than the water outlet port 30. The air passageway branch 28 is provided with an exit for its water, for instance by way of a port 34 communicating with the water passageway 24. The arrangement of the ports prevents the entry into the control member of gas evolving from the cell which might disturb the regular functioning of the apparatus. There is no direct passage from the vent 35 to the vent 30— the mass of the control member (see Figure 2) interposed between these vents prevents the flowing of turbulent currents through from one side to the other of the control member, however violent be the motion of the battery. These currents are effectively baffled by the solid wall which separates the passages 28 and 29.

The above-described apparatus has been found in practice to operate well in automatically replenishing the liquid in a battery cell as frequently as required by the dropping of the electrolyte level below the minimum at which the plates are covered to a safe depth, and without excessive supply of liquid from the reservoir such as to result in flooding the battery—with consequent subjection of the contiguous parts to corroding action. Some of the functioning is still obscure to me and requires further controlled tests. But the following appears to be the method of operation:

Normally the electrolyte fills the battery above the plates to a height somewhat above the upper edge of air inlet 35, with a safe margin between the electrolyte level and the underside of battery top 9. Owing to the vented construction of the battery closure, the air within the battery is at atmospheric pressure. Gas evolved in the battery escapes between the control member and the closure cap through the venting slots and grooves. The arrangement of the ports in the control member prevents the gas from entering there. With the reservoir properly charged with water to cover the upper ends of passages 13 and 14, the last refilling operation has left the whole system full of liquid up to the water level in the reservoir, with pressure in the reservoir below atmospheric to an extent measured by the height of the water column between the liquid levels in battery and reservoir.

As the electrolyte level in the battery lowers by reason of evaporation and battery activity, it approaches the upper edge of the air inlet 35. If the automobile on which the apparatus is mounted is in motion, with resulting agitation of the surface of the liquid, the inlet will be exposed to the air pressure in the battery for brief and interrupted periods before the liquid level as a whole has lowered to that point. In either case, whether at rest or in motion, the exposure of the inlet results in the admission of a bubble of air to branch air passageway 29—the admission acting earlier, and in smaller quantities, and so tending to replenish the battery in smaller graded increments if the battery is in motion than is the case if the battery is at rest.

The operation of the system hereupon is though to depend upon surface tension and capillary attraction, active at the air inlet port 35 and at the junction 17' of small air tube 17 with the air chamber 25 of relatively much larger cross-section. Unless this were the case, whenever the water level dropped even slightly below the top of the air inlet 35 a bubble of air would enter the air inlet and would immediately rise through tube 17 into the reservoir 2, displacing a corresponding volume of water, which would flow down through the water tube 16 into the battery and raise the level sufficiently to close the inlet 35. This theoretical operation is not realized because the surface tension and capillary attraction of the water in the inlet 35 and at the bottom 17' of the tube 17 restrain the passage of air. Surface tension at the inlet 35 requires the level of the liquid in the battery jar to drop considerably below the top of the inlet 35 before the air can penetrate through the inlet. Surface tension and capillary attraction at the mouth 17' of tube 17 prevent the air, which is collecting in chamber 25, from passing up the tube 17, until they are overcome by the increasing difference in pressure in the air tube and the water tube caused by gradual displacement of water from air chamber 25 by bubbles of air entering through inlet 35. The dimensions of the air chamber are so proportioned with reference to the inner diameter of the tube 17 that the system becomes unbalanced and the circulation begins before the water level in the air chamber has subsided to the top of the inlet 35. In fact under certain conditions and with certain dimensions the passageway may remain substantially full of water, because escape through the air inlet 35 is impeded by surface tension and capillary forces. The dimensions shown in the drawing have been found to give good results. When the body of air in chamber 25 once penetrates into tube 17, it becomes vertically elongated, due to the smaller cross-section of the tube 17, thus accentuating the unbalance of pressure in the air and water tubes and accelerating the flow upward in the first of these tubes and downward in the other. When the battery cell is being joggled, as it is when the car is being driven, the inlet 35 is uncovered only intermittently and air enters it only in bubbles.

Thus below the air in the chamber 25 there is water in the passageway 29, which may contain a bubble or two of air. As the air in chamber 25 passes into tube 17 it will be followed by water from the passageway 29, which may contain bubbles of air. When all of the air which first accumulated in chamber 25 has passed into the reservoir 2 and displaced a corresponding volume of water down through tube 16, there will be in tube 17 a column consisting of slugs of water interrupted by bubbles of air. If the bubbles of air in the tube 17 displace a sufficient volume of water the unbalance of pressure in the air tube and water tube will be sufficient to suck into the mouth 17' of the tube 17 any air bubbles that enter the chamber 25, thus continuing the flow upward in the air tube 17 and downward in the water tube 16. As the air bubbles entering the inlet 35 become less numerous, due to the rise in level of the electrolyte in the battery cell, the balance of presure between the tubes 16 and 17 will approach a point of equilibrium at which the surface tension and capillary attraction at the mouth 17', whenever an air bubble reaches that point, again predominate and prevent the entrance of the air bubble into the tube 17. However, due to the presence of bubbles in the tube 17, a certain unbalance will remain and it will require only a slight additional amount of air entering the inlet 35 to increase the unbalance to a point where air in chamber 25 will be forced into the mouth 17'. The system therefore remains close to the equilibrium point, moving only slowly and by small degrees to feed water down through the water tube 16 as each tiny bubble enters the inlet 35. Flooding cannot occur because the static conditions within the system are not upset by the rush of water through the control member with the swaying of the battery, as occurs with some control devices previously known, due to the baffle between ports 35 and 34. Air can only enter the inlet 35 a bubble at a time and there is at no time a sudden dumping of the system which would leave the space within the reservoir 2 in open communication with the atmosphere through the air tube. If there were open communication of the reservoir with the atmosphere at any time, there would be a continued flow of water from the reservoir after the level of the liquid in the battery had been raised above the inlet 35 and this flow would be sufficient to flood the battery, as has been found in the use of certain systems tried heretofore.

With this system not only does the balance between the inlet and outlet systems remain within very close limits, but, by reason of the slight increments of air to the closed system, the drop in pressure between the battery and reservoir is maintained substantially constant—except for the slight drop due to the gradual lowering of the level of water in the reservoir—after it has been set by the preliminary charging of the reservoir and its inversion and connection to the battery.

Furthermore there results so large a proportion of liquid fed up with the air to the reservoir, that the liquid in battery and reservoir quickly reaches a like maximum density and freezing of the solution in the reservoir is prevented.

I claim:—

1. In apparatus of the character described, a control member having separate air and water passageways having independent connection with a water reservoir, the water passageway having a discharge port adjacent to the bottom of the control member, the air passageway having an air chamber and having two branches below said air chamber both connected therewith, one branch having an air inlet opening in its side at a point removed from the bottom of the control member and the other having a water vent adjacent the bottom of the control member opening into the lower end of the water passageway.

2. In apparatus of the character described, in combination with an elevated water reservoir having independent air and water conduits, the air conduit having means for permitting air to pass in one direction while impeding the passage of water in the other direction, a control member for a battery cell having air and water passages independently connected with said conduits, an enlarged air chamber in the air passageway, two branch passageways below said chamber one having an air inlet in its side at a point removed from the bottom of the control member, the water conduit having a water discharge port immediately over the bottom of the control member and the other branch air conduit having a water discharge opening in substantially the plane of the discharge port of the water conduit.

3. In apparatus of the character described, a hollowed out cap for a battery cell having converging interior walls, a control member having a corresponding converging portion, locking shoulders on said cap and member, and venting grooves and slots in the control member.

4. In apparatus of the character described, a control member having separate air and water passageways having independent connection with a water reservoir, the water passageway having a discharge port adjacent to the bottom of the control member, the air passageway having an inlet for air above said discharge port and an outlet for water, and baffling means between said inlet and said outlet.

5. In apparatus of the character described, a control member having separate air and water passageways having independent connection with a water reservoir, the water passageway having a discharge port adjacent to the bottom of the control member, the air passageway having an inlet for air above said discharge port and an outlet for water, and baffling means between said inlet and said outlet, the diameter of the connection between said air passageway and the reservoir being sufficiently small to cause a considerable force due to capillarity and surface tension to be set up at its entrance when covered by an air bubble, said air passageway having a sufficient height to receive a body of air capable of unbalancing the system and overcoming said force, without the liquid in said air passageway subsiding to the level of the top of said inlet.

6. In apparatus of the character described, a control member having separate air and water passageways having independent connection with a water reservoir, the water passageway having a discharge port adjacent to the bottom of the control member, the air passageway being formed with downwardly directed forks separated by an upright wall, each fork having an opening near the bottom of the control member, one of said openings being above said discharge port.

THOMAS T. TOWNSEND.